United States Patent
Fukshima et al.

(10) Patent No.: US 7,068,431 B2
(45) Date of Patent: Jun. 27, 2006

(54) OPTICAL DEVICE USING PHOTONIC CRYSTAL AND LIGHT BEAM DEFLECTION METHOD USING THE SAME

(75) Inventors: Hiroshi Fukshima, Kadoma (JP); Sibei Xiong, Katano (JP)

(73) Assignee: Matsushita Electric Works, Ltd., Osaka (JP)

(*) Notice: Subject to any disclaimer, the term of this patent is extended or adjusted under 35 U.S.C. 154(b) by 0 days.

(21) Appl. No.: 10/882,242

(22) Filed: Jul. 2, 2004

(65) Prior Publication Data
US 2005/0030611 A1 Feb. 10, 2005

(30) Foreign Application Priority Data
Jul. 30, 2003 (JP) ............................. 2003-283119

(51) Int. Cl.
*G02B 27/10* (2006.01)

(52) U.S. Cl. ....................... 359/618; 359/322; 359/323

(58) Field of Classification Search ................ 359/618, 359/256–258, 322–323, 320
See application file for complete search history.

(56) References Cited

U.S. PATENT DOCUMENTS

| | | | |
|---|---|---|---|
| 6,064,506 A | 5/2000 | Koops | |
| 6,317,554 B1 * | 11/2001 | Kosaka et al. | ............... 385/132 |
| 6,674,954 B1 * | 1/2004 | Baba et al. | .................. 359/196 |
| 6,822,784 B1 * | 11/2004 | Fukshima et al. | .......... 359/298 |
| 2002/0135863 A1 | 9/2002 | Fukushima et al. | |

FOREIGN PATENT DOCUMENTS

| | | |
|---|---|---|
| EP | 1 089 095 A2 | 4/2001 |
| JP | 10-090634 A1 | 4/1998 |
| JP | 2001-013439 A1 | 1/2001 |

OTHER PUBLICATIONS

Hans W.P. Koops "Photonic Crystals Built by Three-dimensional Additive Lithography Enable Integrated Optics of High Density" Proceedings of the SPIE, SPIE, Bellingham, VA, US, vol. 2849 (Aug. 5, 1996) pp. 248-256, XP000617864, ISSN: 0227-786X.

A. Figotin et al., "Tunable Photonic Crystals" Materials Research Society Symposium Proceedings, Materials Research Society, Pittsburg, PA, U.S., vol. 603 (Nov. 30, 1999), pp. 195-200, XP001034373, ISSN: 0272-9172.

* cited by examiner

*Primary Examiner*—Huy Mai
(74) *Attorney, Agent, or Firm*—Rader, Fishman & Grauer (57) ABSTRACT

A compact, low-consumption optical device using a photonic crystal is provided. This optical device comprises a photonic crystal designed to have a shape of a dispersion surface with a strong direction dependence at a frequency, and light input means for allowing a light beam having a wavelength determined by said frequency to be incident on said photonic crystal at an incident angle determined from a region with a large change of direction dependence in the shape of the dispersion surface according to the law of conservation of momentum. In case of adopting this incident angle, the light beam can be deflected by the photonic crystal at an angle that is from several ten times to several hundred times larger than of the deflection angle obtained by use of a conventional optical material.

7 Claims, 12 Drawing Sheets

OPTICAL DEVICE USING PHOTONIC CRYSTAL AND LIGHT BEAM DEFLECTION METHOD USING THE SAME

BACKGROUND OF THE INVENTION

1. Field of the Invention

The present invention relates to a compact, low-consumption, sensitive optical device using a photonic crystal, and a method of determining an optimum angle of a light beam incident on the photonic crystal such that the light beam can be deflected at a large deflection angle by the photonic crystal.

2. Disclosure of the Prior Art

Photonic crystal is of an artificial multidimensional periodic structure obtained by periodically arranging at least two materials having different dielectric constants at an interval substantially equal to the wavelength of light. In the expectation that the photonic crystal would remarkably enhance the control of light, it is being vigorously developed as the next generation optical equipment.

Figure 20:
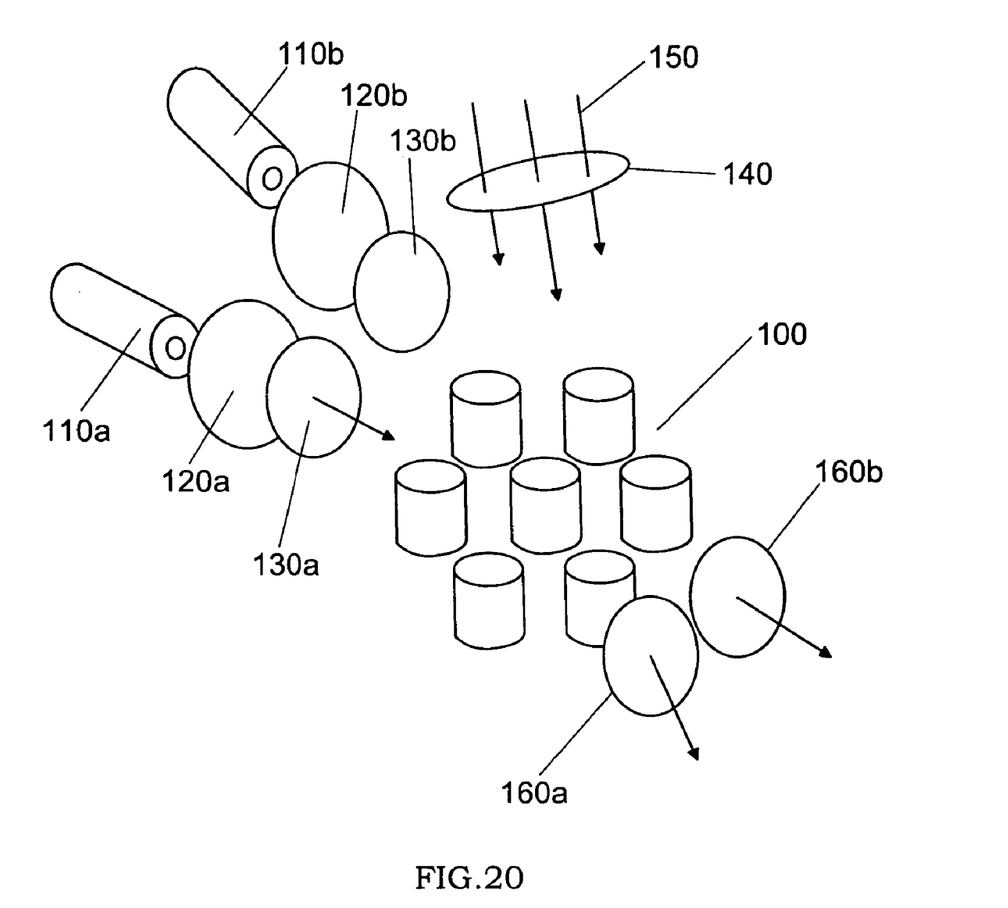
FIG. 20 is a schematic perspective view of a conventional optical switch using a photonic crystal.

As an optical switch using the photonic crystal, for example, an optical switch is disclosed in Japanese Patent Early Publication [kokai] No. 10-90634. As shown in FIG. 20, this optical switch is for switching between the ON position (transmission) where a light beam incident on the photonic crystal (=incident light beam) is allowed to pass through the photonic crystal, and the OFF position (reflection) wherein the light beam is reflected from the photonic crystal to prevent the transmission of the light beam.

That is, light beams provided from a pair of optical fibers 110$a$, 110$b$ are incident on the photonic crystal 100 through collimator lenses 120$a$, 120$b$ and polarizers 130$a$, 130$b$. This optical switch comprises a means for irradiating a control light 150 to the photonic crystal 100 through a circular polarizer 140. The irradiation of the control light 150 causes a change in a photonic band gap structure of the photonic crystal 100, so that it becomes possible to switch between the ON and OFF positions. In the ON position, the transmitted light beam passing through the photonic crystal 100 is output through a pair of polarizers 160$a$, 160$b$.

Thus, since the purpose of this optical switch is to switch between the ON position for allowing the light beam to pass through the photonic crystal and the OFF position for reflecting the light beam from the photonic crystal, it merely provides the presence or absence of the transmitted light beam as the output. Therefore, this limits the application areas of the optical switch.

If the light beam incident on the photonic crystal can be deflected at a large angle, this technique will be fit for a wide range of uses such as compact, low-consumption optical devices and variable optical attenuator (VOA). In addition, according to the deflection phenomenon of the light beam by the photonic crystal, when an energy change in the photonic crystal is caused by an environment change around the photonic crystal, a change in deflection angle of the light beam occurs. By detecting this change in deflection angle, it is expected to sense the environment change with a high resolution. Thus, it has a great potential for improving detection accuracy of the optical sensor.

SUMMARY OF THE INVENTION

Therefore, a primary object of the present invention is to provide a compact, low-consumption, sensitive optical device using a photonic crystal, which has the capability of deflecting a light beam incident on the photonic crystal at a remarkably large angle.

That is, the optical device of the present invention comprises a photonic crystal designed to have a shape of a dispersion surface with a strong direction dependence at a frequency; and light input means for allowing a light beam having a wavelength determined by the frequency to be incident on the photonic crystal at an incident angle determined from a region with a large change of direction dependence in the shape of the dispersion surface according to the law of conservation of momentum.

According to the present invention, by allowing the light beam having the specific wavelength to be incident on the photonic crystal at the specific angle, it is possible to deflect the light beam by the photonic crystal at an angle that is from several ten times to several hundred times larger than of the deflection angle obtained by use of a conventional optical material such as glass or polymer. Therefore, it is possible to remarkably downsize the optical device.

As a preferred embodiment of the present invention, the optical device further comprises a deflection controller for applying energy to the photonic crystal to deflect the light beam incident on a light input surface of the photonic crystal, and provide a transmitted light beam from a light output surface other than the light input surface of the photonic crystal. In this case, since the deflection angle of the light beam incident on the photonic crystal is controlled by the deflection controller, it is possible to provide a compact optical switch having a plurality of light paths. In addition, it is possible to prevent crosstalk and ensure high transmission efficiency.

As another preferred embodiment of the present invention, the optical device further comprises at least one detector disposed adjacent to the photonic crystal to receive the light beam provided from the photonic crystal, and wherein when an energy change in the photonic crystal is caused by an environment change around the photonic crystal, the detector detects a change of deflection angle of the light beam by the photonic crystal, or a change of optical strength derived from the change of deflection angle and thereby recognize the environment change. In this case, since a slight change in the environment around the photonic crystal is detected as a large change in deflection angle of the light beam by the photonic crystal, it is possible to provide a compact optical sensor having the capability of detecting the environmental change with high sensitivity.

A further object of the present invention is to provide a method of determining an optimum angle of a light beam incident on a photonic crystal to deflect the light beam at an angle that is from several ten times to several hundred times larger than of the deflection angle obtained by use of a conventional optical material.

That is, the method of the present invention comprises the steps of:

preparing said photonic crystal made of two different materials having first and second refraction indexes;

making a first frequency dispersion curve at the first refraction index;

making a second frequency dispersion curve at the second refraction index;

selecting a frequency at which the magnitude of wavenumber vector changes from between the first and second frequency dispersion curves;

constructing a constant frequency dispersion surface at said frequency; and determining the optimum angle from a region with a maximum change of direction dependence in the constant frequency dispersion surface according to the law of conservation of momentum.

In addition, another object of the present invention is to provide a method of deflecting a light beam with use of a photonic crystal at a large deflection angle.

That is, this method comprising the steps of:

preparing said photonic crystal made of two different materials having first and second refraction indexes;

making a first frequency dispersion curve at the first refraction index;

making a second frequency dispersion curve at the second refraction index;

selecting a frequency at which the magnitude of wavenumber vector changes from between the first and second frequency dispersion curves;

constructing a constant frequency dispersion surface at said frequency;

determining the optimum angle from a region with a maximum change of direction dependence in the constant frequency dispersion surface according to the law of conservation of momentum;

preparing said light beam having a wavelength determined by said frequency; and allowing said light beam to be incident on the photonic crystal at the optimum angle, so that the incident light beam is deflected at a large deflection angle by said photonic crystal.

These and still other objects and advantages of the present invention will become more apparent from detail description of the present invention described below, referring to the attached drawings.

DETAIL DESCRIPTION OF THE INVENTION

Optical devices of the present invention are explained in detail according to preferred embodiments described below.

First Embodiment

Figure 1:
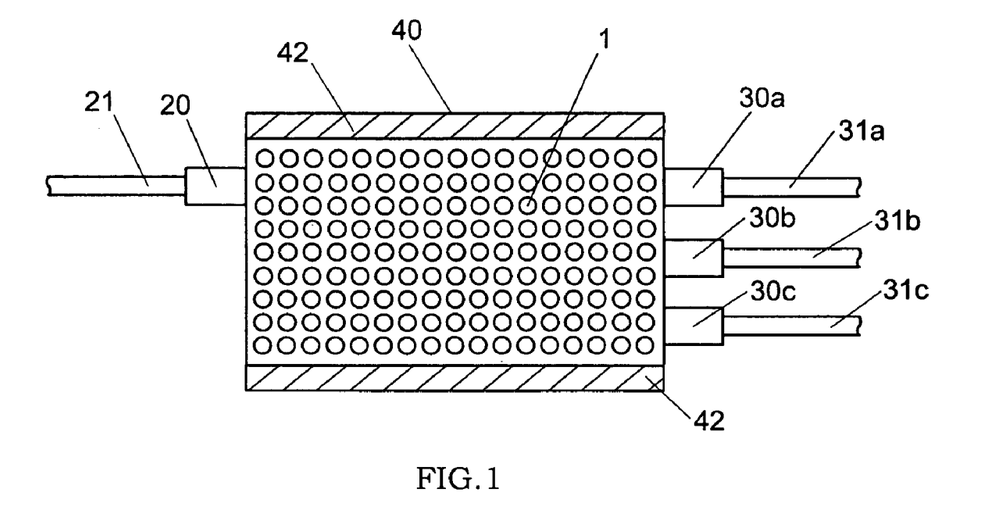
FIG. 1 is a schematic diagram of an optical switch according to a first embodiment of the present invention.

As a first embodiment of the optical device of the present invention, an optical switch is explained below. As shown in FIG. 1, this optical switch comprises a photonic crystal 1, light input terminal 20 such as a waveguide and an optical fiber with lens for allowing a light beam provided from an optical fiber 21 to be incident on a light input surface of the photonic crystal at a required incident angle, deflection controller 40 for applying an energy to the photonic crystal to control the deflection angle of the light beam incident on the photonic crystal, and providing a transmitted light beam from a light output surface other than the light input surface of the photonic crystal, and three light output terminals (30a, 30b, 30c) such as rod lens, through any one of which the transmitted light beam is provided to the corresponding optical fiber (31a, 31b, 31c).

The photonic crystal 1 is of a multi-dimensional periodic structure obtained by periodically arranging at least two materials having different dielectric constants at an interval substantially equal to the wavelength of light. In other words, the photonic crystal 1 is of an artificial periodic or quasi-periodic structure formed with at least two materials having different refractive indexes, which are periodically arranged at an interval substantially equal to a half of the wavelength of a light beam to be incident on the photonic crystal. The thus formed photonic crystal has a photonic band gap structure, by which an angle of a transmitted light beam passing through the photonic crystal with respect to the light beam incident on the photonic crystal is determined. The photonic crystal 1 used in the optical device of the present invention is designed to have a shape of a dispersion surface with strong direction dependence at a specific frequency.

As an optical property peculiar to the photonic crystal, it is known that when the wavelength of a light beam incident on the photonic crystal changes by only 1%, the deflection angle of the incident light beam increases by approximately 50 degrees. This phenomenon was found in the year 1999, and called as the "super prism effect". This phenomenon originates from a large change in the shape of the photonic dispersion surface caused by a small change in wavelength of the light beam incident on the photonic crystal.

However, since the super prism effect is the phenomenon caused by the change in wavelength, there is no guarantee that such a large deflection is obtained when external energy is applied to the photonic crystal under the condition that the super prism effect happens, so that a change in the refraction index of the photonic crystal occurs. On the other hand, to cause the large deflection by the change in refraction index, it is needed to determine an optimum angle of the light beam incident on the photonic crystal in consideration of the crystal structure of the photonic crystal.

Therefore, in the present invention, it is essential to allow a light beam having a specific wavelength determined by a frequency, at which the shape of the dispersion surface has a strong direction dependence, to be incident on the photonic crystal at a specific incident angle determined from a region with a large change of direction dependence in the shape of the dispersion surface according to the law of conservation of momentum. Under this condition, when external energy is applied to the photonic crystal, the shape of the dispersion surface of the photonic crystal changes, so that the light beam incident on the photonic crystal can be deflected at an angle that is from several ten times to several hundred times larger than the deflection angle obtained by use of a conventional optical material such as glass or polymer. The present invention adopts this phenomenon to the optical device. In the present invention, the optimum angle of the light beam incident on the photonic crystal can be determined by the following method.

Figure 2:
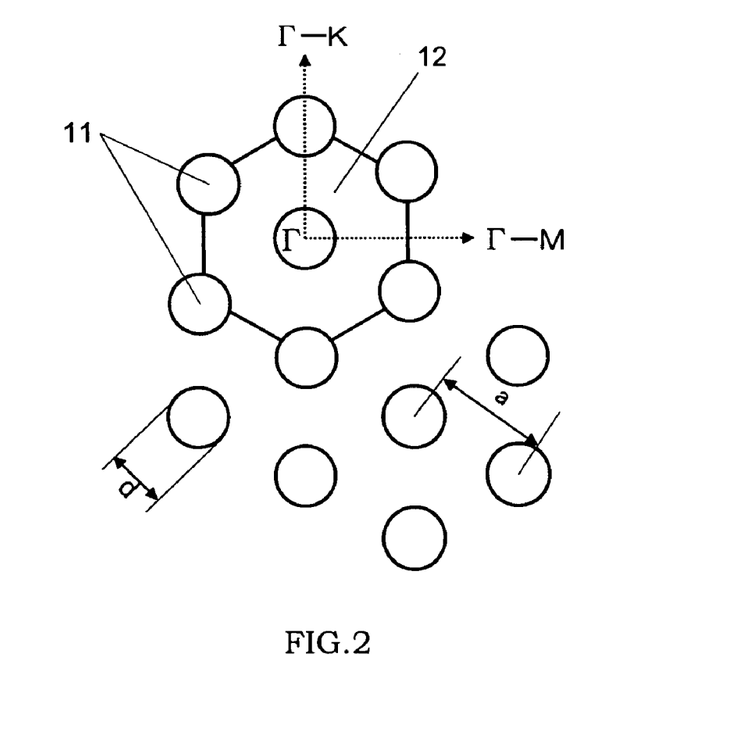
FIG. 2 is a diagram illustrating a structure of a photonic crystal for the optical switch.

In this embodiment, the photonic crystal with the structure shown in FIG. 2 is used. This photonic crystal has a two-dimensional periodic structure formed by arranging a plurality of air holes 11 having a refraction index of 1 in a high refractive material 12 such as lead lanthanum zirconium titanate (PLZT) having a refraction index of 2.5 in a triangular pattern. In FIG. 2, each of "Γ", "M" and "K" designate a traveling direction of light in the photonic crystal, which is usually used in the field of crystal optics or semiconductor optics. For example, the "Γ–M" direction means that light travels from "Γ" to "M". Similarly, the "Γ–K" direction means that light travels from "Γ" to "K".

Figure 3:
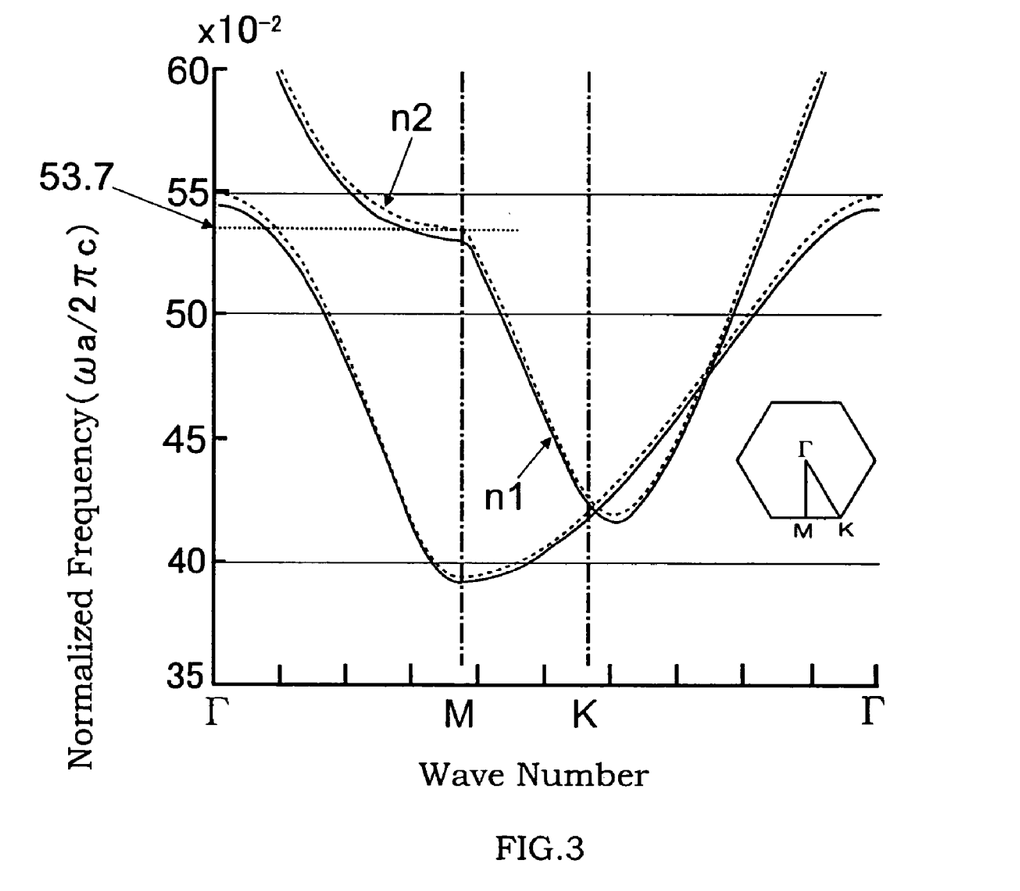
FIG. 3 is a graph showing a frequency dispersion curve of the photonic crystal.

Next, as shown in FIG. 3, a first frequency dispersion curve (solid line) for a first refraction index (n1) of the photonic crystal and a second frequency dispersion curve (dotted line) for a second refraction index (n2) of the photonic crystal are created. For example, when the first refraction index (n1) is 2.5, the second refraction index (n2) can be 2.475, which corresponds to a 1% change of the first refraction index.

Next, a frequency, at which K magnitude of wavenumber vector widely changes between the first and second frequency dispersion curves (n1, n2), is determined. In other words, the frequency having a maximum distance in the wavenumber (horizontal) direction between the first and second frequency dispersion curves (n1, n2) is determined. In FIG. 3, when the normalized frequency ($\lambda/a$: "$\lambda$" is a wavelength of the light beam, "a" is a pitch between adjacent air holes 11) is $53.7 \times 10^{-2}$ ($\omega a/2\pi c$), the horizontal distance between the dispersion curves becomes maximum.

Figure 4:
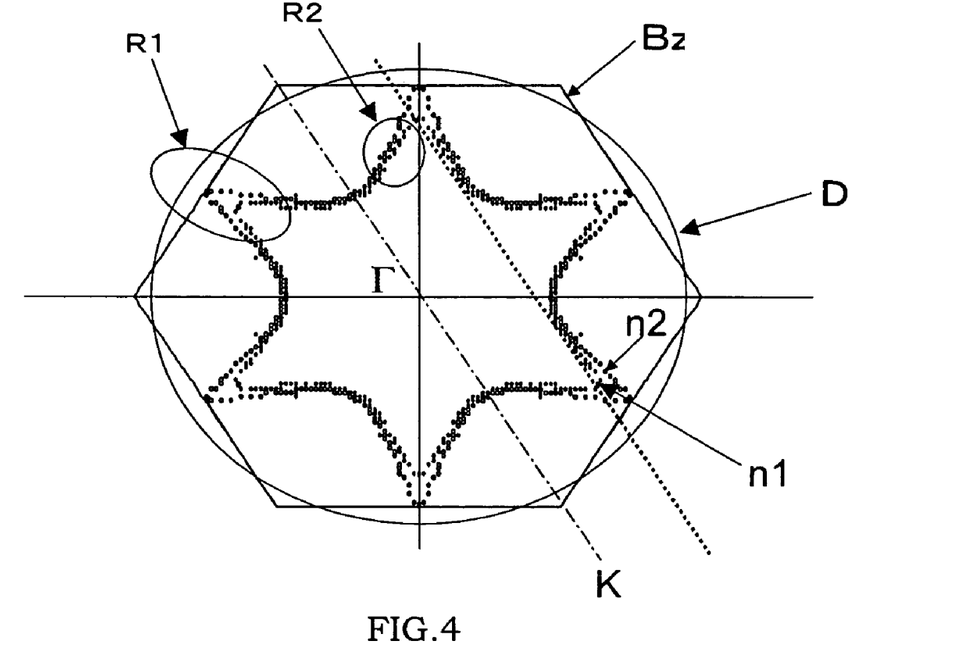
FIGS. 4 to 7 are explanatory diagrams of a method of determining an optimum angle of a light beam incident on the photonic crystal according to a preferred embodiment of the present invention.

Next, a constant frequency dispersion surface is calculated at the frequency determined above, as shown in FIG. 4. The optimum incident angle can be determined from a region with the maximum change of directional dependency in the constant frequency dispersion surface according to the law of conservation of momentum. First, a dispersion curve "D" of air that is a medium at the incident side of the photonic crystal is drawn on the constant frequency dispersion surface, as shown in FIG. 4. In FIG. 4, the symbol "●" designates the constant frequency dispersion surface for the first refraction index (n1), and the symbol "○" designates the constant frequency dispersion surface for the second refraction index (n2). In the constant frequency dispersion surface of FIG. 4, for example, a region designated by the circle "R1" corresponds to the region with a large directional dependency, and a region designated by the circle "R2" corresponds to the region with a small directional dependency. In FIG. 4, "Bz" designates a Brillouin zone.

Figure 5:
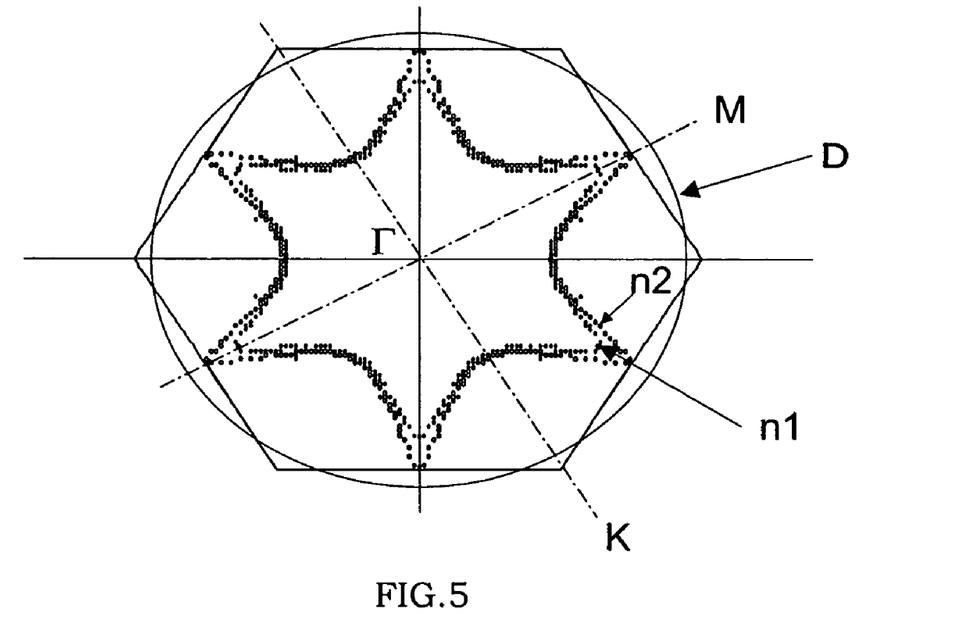

Next, as shown in FIG. 5, an incident surface (interface) is determined. In this embodiment, the incident surface is set in a "Γ–M" direction, the "Γ–K" direction is orthogonal to the "Γ–M" direction. In addition, a line extending in the "Γ–M" direction passes an apex of a star-like shape of the dispersion curve of FIG. 5. Thus, in the case of setting the incident surface (interface) in the "Γ–M" direction, there is an advantage that the optical device is easy to design.

Figure 6:
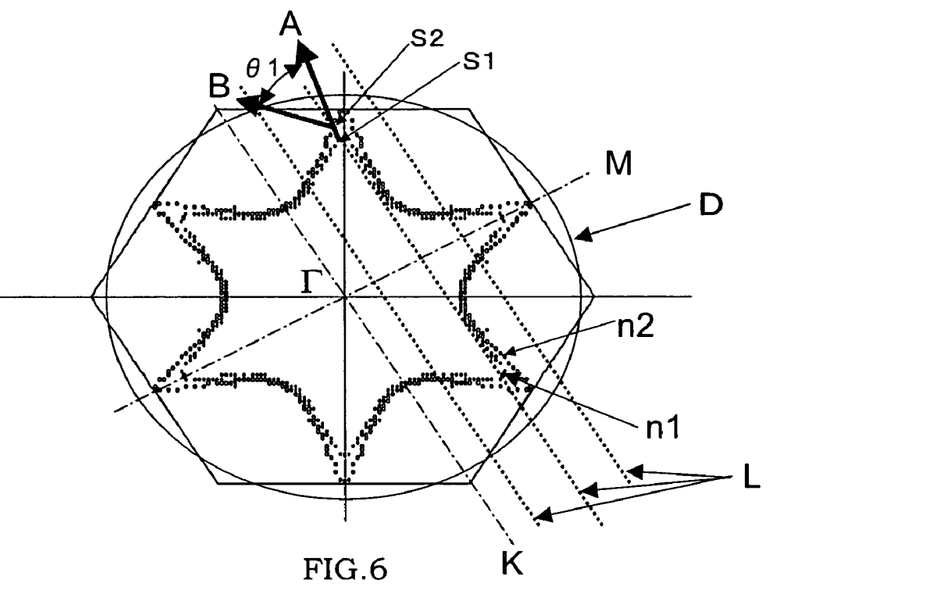

Next, as shown in FIG. 6, imaginary construction (straight) lines "L" orthogonal to this incident surface "Γ–M", i.e., parallel to the "Γ–K" direction are drawn on the constant frequency dispersion surface. With respect to each of the construction lines "L", an intersection point (S1) between the construction line "L" and the first frequency dispersion curve (n1) and an intersection point (S2) between the construction line "L" and the second frequency dispersion curve (n2) are determined. In addition, an angle "θ1" between a normal line (A) on the intersection point (S1) and a normal line (B) on the intersection point (S2) is determined. As a result, the construction line "L" providing the largest angle "θ1" is obtained.

Figure 7:
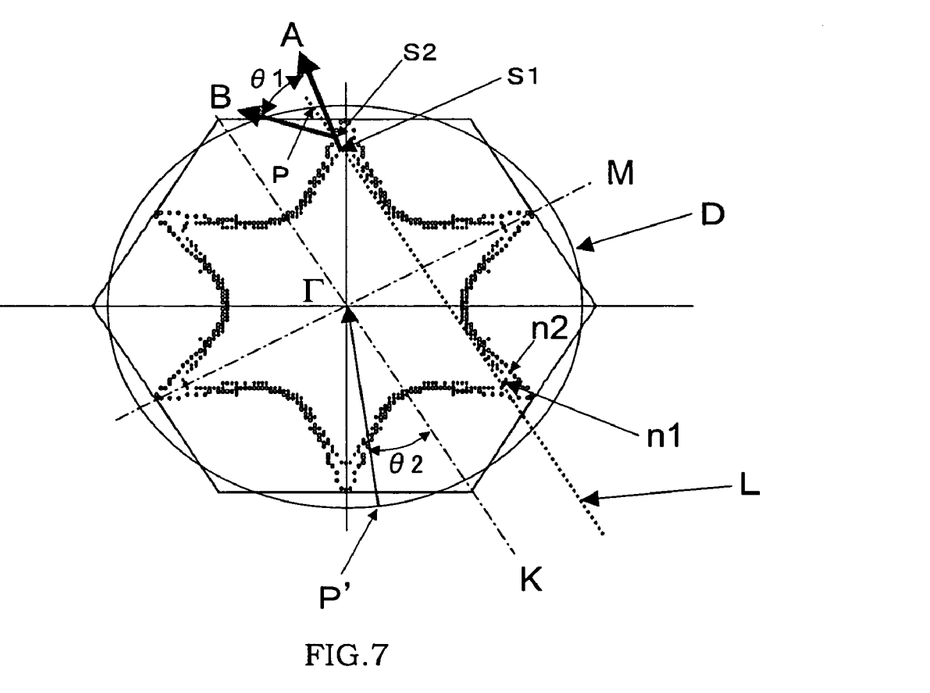

Next, as shown in FIG. 7, an intersection point (P) between the obtained construction line "L" providing the largest angle "θ1" and the dispersion curve "D" of air is determined. In consideration that a light beam incident on a crystal is usually drawn at the opposite side to a light output surface of the crystal, a position (P') is determined at the incident side so as to be the same kinetic momentum in the lateral direction as the intersection point (P). As a result, the optimum incident angle to be determined is defined as an angle "θ2" between the "Γ–K" direction and a straight line passing the point (P') and the center "Γ". When the light beam is incident on the photonic crystal at this angle, it is possible to achieve a deflection angle that is from several ten times to several hundred times larger than the deflection angle obtained by use of a conventional optical material.

In the above method, the incident surface (interface) "Γ–M" was previously set. However, as described below, the optimum incident angle may be determined without previously setting the incident surface.

Figure 8:
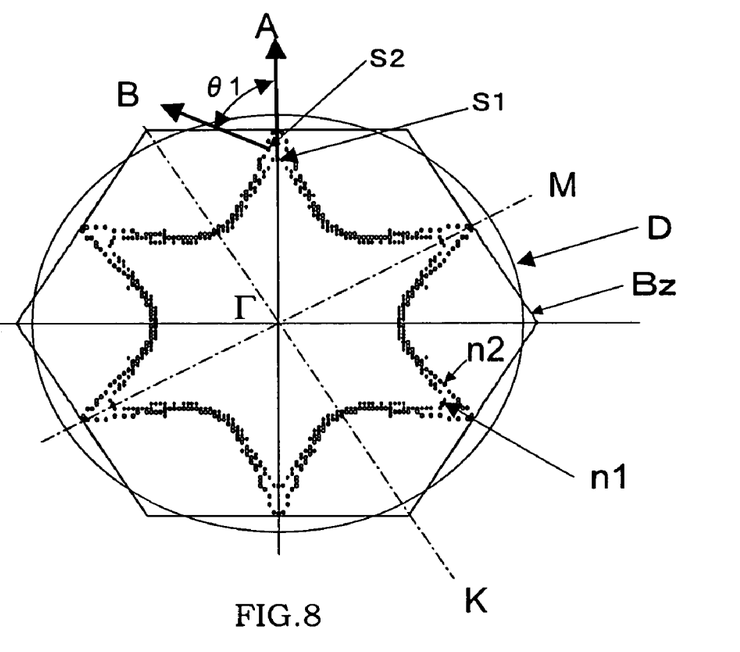
FIGS. 8 to 11 are explanatory diagrams of another method of determining the optimum angle of the light beam incident on the photonic crystal according to a modification of the preferred embodiment.
Figure 9:
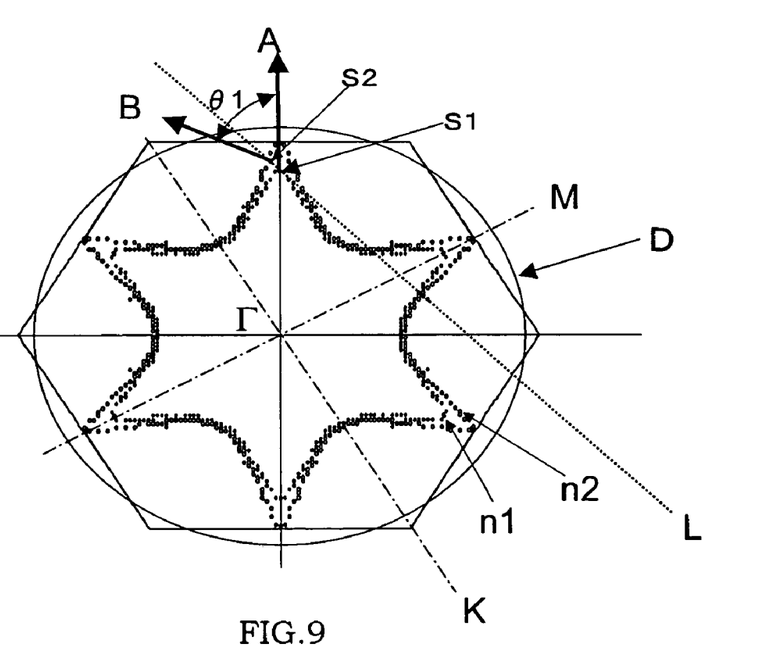
Figure 10:
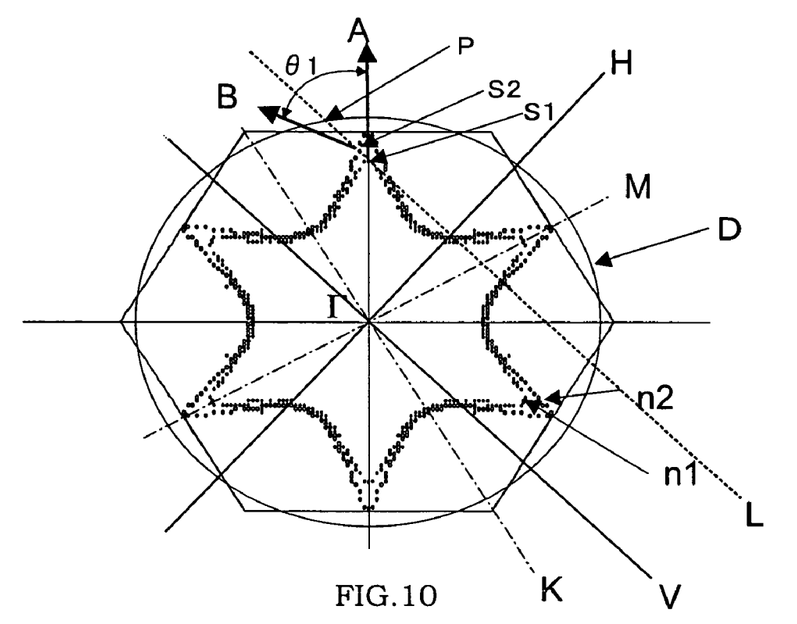

That is, as shown in FIG. 8, in consideration of the relationship between the incident angle and the deflection angle, two points (S1, S2) on the first and second frequency dispersion curves are determined such that the angle "θ1" between the normal line (A) at the point (S1) on the first frequency dispersion curve and the normal line (B) at the point (S2) on the second frequency dispersion curve become maximum. As a result, as shown in FIG. 9, the construction line "L" is provided by a straight line passing these points (S1, S2). In addition, as shown in FIG. 10, an incident surface (interface) "H" can be defined by a straight line passing through the center "Γ" and orthogonal to the construction line "L".

Figure 11:
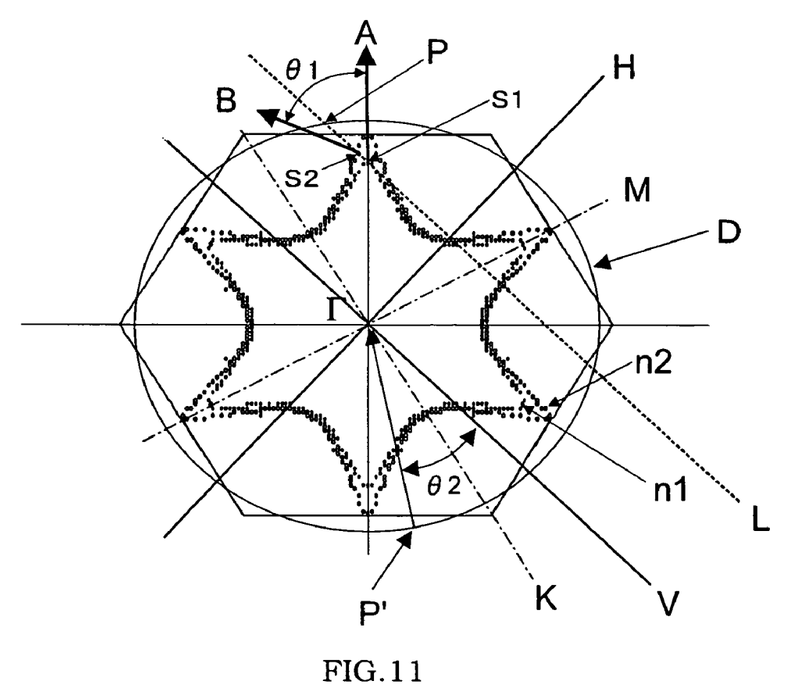

Next, as shown in FIG. 11, an intersection point (P) between the construction line "L" and the dispersion curve "D" of air is determined. As described above, In consideration that a light beam incident on a crystal is usually drawn at the opposite side to a light output surface of the crystal, a position (P') is determined at the incident side so as to be the same kinetic momentum in the lateral direction as the intersection point (P). As a result, the optimum incident angle to be determined is defined as an angle "θ2" between a straight line "V" extending orthogonal to the incident surface (interface) "H" at the center "Γ" and a straight line passing the point (P') and the center "Γ". When the light beam is incident on the photonic crystal at this angle, it is possible to obtain the remarkably large deflection angle.

Figure 12:
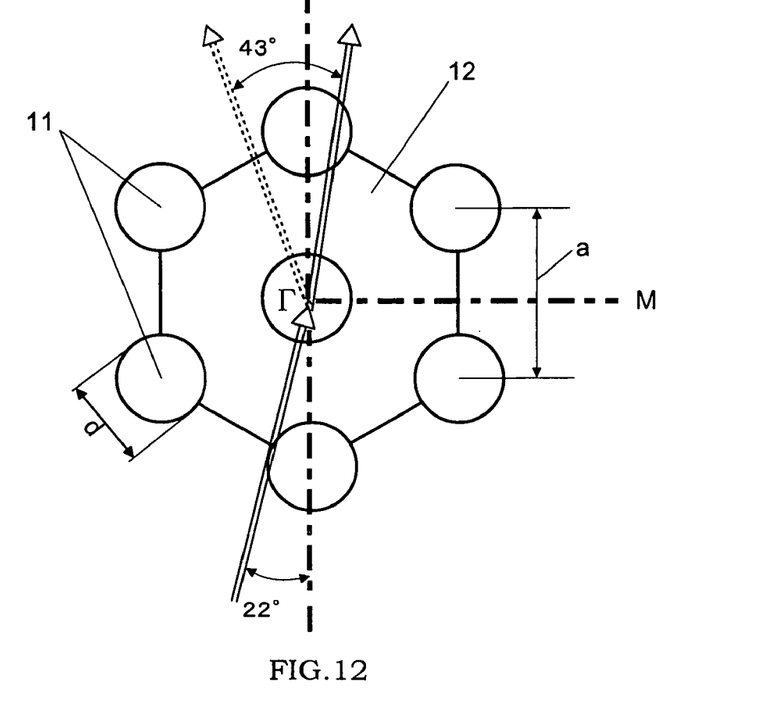
FIG. 12 is a diagram illustrating a deflection of the light beam incident on the photonic crystal at the optimum angle determined according to the present invention.

For example, as shown in FIG. 12, the photonic crystal used in the optical switch of the present invention has a two-dimensional periodic structure obtained by arranging a plurality of air holes 11 having a diameter "d" of 0.56 µm and a refraction index of 1 in a lead lanthanum zirconium titanate 12 (PLZT) having a refraction index of 2.5 in a triangular pattern such that a pitch "a" between adjacent air holes 11 is 0.8 µm, and the normalized frequency "λ/a" is 0.537, wherein "λ" is a wavelength of the light beam. In this case, when allowing the light beam to be incident on the photonic crystal at the incident angle of 22 degrees against the "Γ–K" direction orthogonal to the incident surface in the "Γ–M" direction of the two-dimensional periodic structure, and applying an electric field to the photonic crystal to change the refraction index of the photonic crystal, it is possible to achieve a large deflection angle of 43 degrees by 1% change in the refraction index.

Therefore, it is possible to remarkably downsize the optical switch, and apply a high electric field to the photonic crystal by use of a low voltage. In addition, this optical switch is suitable as a compact, energy consumption optical switch, or variable optical attenuator used at a wavelength of 1.5 µm band for optical communications and networking.

Figure 13:
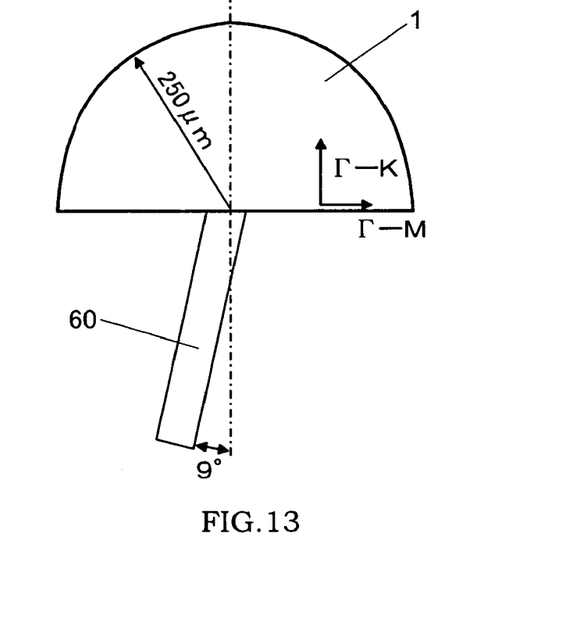
FIG. 13 is a schematic diagram of an optical device with an arcuate surface as a light output surface of the present invention.

By the way, it is not needed that the photonic crystal 1 has the light output surface parallel to the light input surface. For example, as shown in FIG. 13, it is preferred that the photonic crystal 1 has an arcuate surface as the light output surface. In this case, it is possible to further increase a degree of freedom in designing the optical device. In addition, when the light beam is incident on the above-described photonic crystal from the air layer, the optimum incident angle is 22 degrees. However, when the light beam is incident on the photonic crystal from a waveguide made of the same material (e.g., PLZT) as the photonic crystal, the optimum incident angle becomes 9 degrees.

Figure 14A:
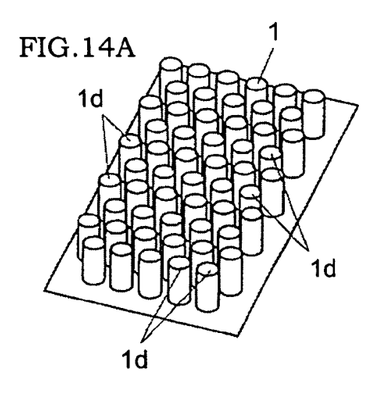
FIGS. 14A to 14E are perspective views of photonic crystals available to the present invention.

In the optical device of the present invention, for example, a photonic crystal 1 shown in FIG. 14A can be used, which is of a 2-dimensional periodic structure obtained by periodically arranging cylindrical bodies $1d$ of a first material at a required interval. In this case, a second material having a different dielectric constant from the first material is filled in spaces between adjacent cylindrical bodies $1d$. As the second material, air may be used.

Figure 14B:
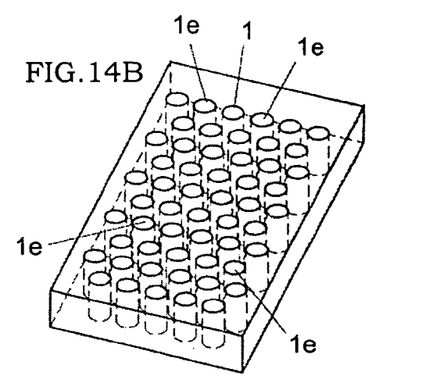

Alternatively, a photonic crystal 1 shown in FIG. 14B may be used, which is substantially the same as the structure of FIG. 14A except that the first and second materials are made of the air and a solid material, respectively. That is, the photonic crystal 1 of FIG. 14B is composed of a rectangular solid of the second material and cylindrical air spaces $1e$ periodically formed at the required interval in the rectangular solid.

Figure 14C:
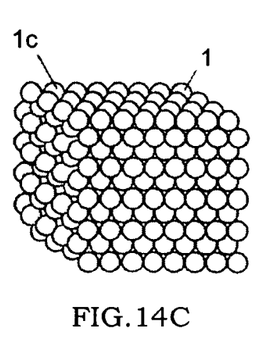

In addition, a photonic crystal 1 shown in FIG. 14C may be used, which is of a 3-dimensional periodic structure obtained by periodically arranging fine spherical bodies $1c$ of the first material at a required interval. This structure is also named as an artificial OPAL structure. In this case, the second material having a different dielectric constant from the first material is filled in spaces between adjacent spherical bodies $1c$. Air may be used as the second material.

Figure 14D:
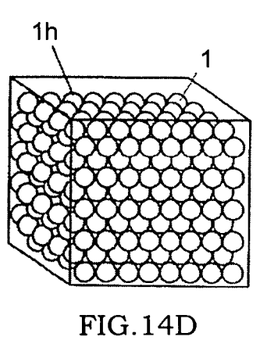

Alternatively, a photonic crystal 1 shown in FIG. 14D may be used, which is substantially the same as the structure of FIG. 14C except that the first and second materials are made of the air and a solid material, respectively. That is, the photonic crystal 1 of FIG. 14D is composed of a cube of the second material and spherical air spaces $1h$ periodically formed at the required interval in the cube. This structure is also named as an inverse OPAL structure.

Figure 14E:
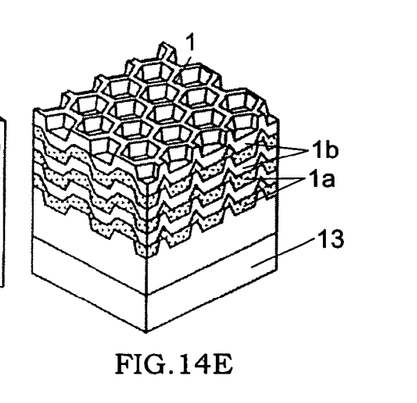

In addition, a photonic crystal 1 shown in FIG. 14E can be used, which is of an artificial laminate structure comprising a substrate 13 (e.g., silicon) having a honeycomb surface, in which hexagonal concaves (not shown) are periodically formed at a required interval, and a required number of thin films laminated on the honeycomb surface. Each of the thin films is composed of a bottom layer $1a$ of the first material (e.g., amorphous silicon) and a top layer $1b$ of the second material (e.g., $SiO_2$).

As an electro-optic material used for the photonic crystal, it is possible to use a material having a nonlinear optical effect such as a Pockels effect that the refractive index changes in proportion to electric field strength, or an optical Kerr effect (third-order nonlinear optical effect) that the refractive index changes in proportion to the square of electric field strength. For example, it is preferred to use an electro-optic material having a Pockels coefficient of $1\times10^{-12} \sim 1000\times10^{-12}$ m/V such as $KH_2PO_4$, $KDS_2PO_4$, $NH_4H_2PO_4$, $RbH_2PO_4$, $CsD_2AsO_4$ (DCDA), $BaTiO_3$, $Ba_{1-x}Sr_xTiO_3$, $LiNbO_3$, $KNbO_3$, $KTiOPO_4$ (KTP), $KTiOAsO_4$ (KTA), $Pb_xLa_{1-x}(Ti_yZr_{1-y})O_3$ (PLZT), BaST, $Sr_xBa_{1-x}Nb_2O_6$ (SBN).

The deflection controller 40 used in the optical switch of the present invention applies the energy to the photonic crystal 1 to change the ratio of refractive index between the materials of the photonic crystal 1. As a result, the incident light beam can be deflected by the photonic crystal. The deflection controller 40 shown in FIG. 1 is formed with a pair of planar electrodes 42 disposed at opposite surfaces of the photonic crystal 1, power source (not shown), and a voltage controller (not shown) for controlling a voltage applied between the electrodes. Therefore, this deflection controller is an electric-field applying unit for applying an electric field to the photonic crystal 1 as the energy. The deflection controller 4 of the present embodiment can change the ratio of refractive index by a magnitude of 0.1 to about 1%. When at least one of the materials of the photonic crystal 1 is an electro-optic material, the deflection controller 40 may apply an electric field developed by light to the photonic crystal 1.

Figure 15:
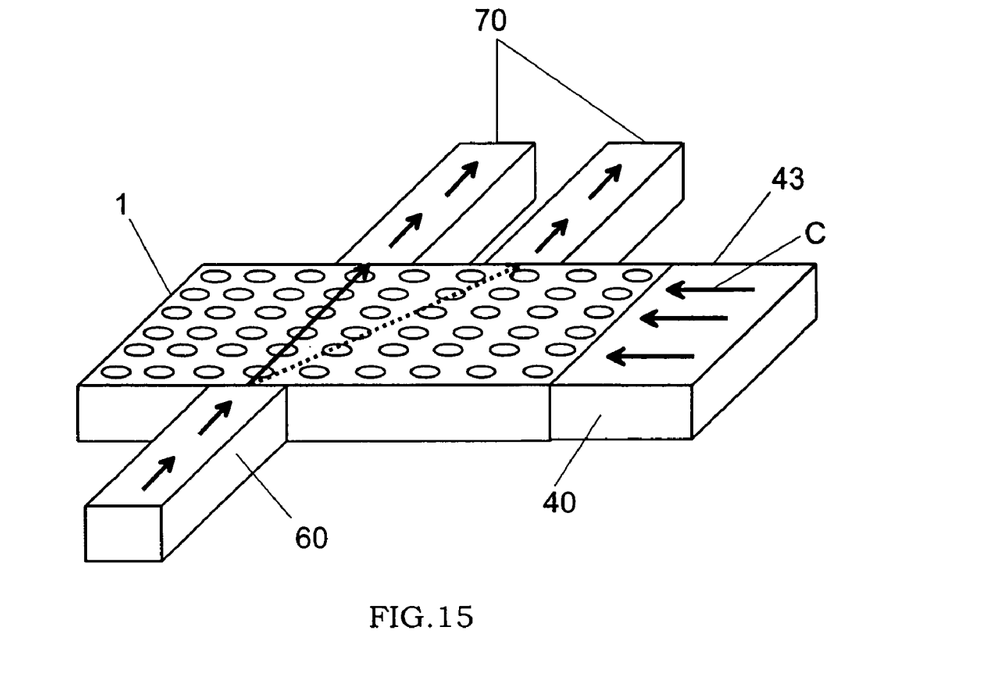
FIG. 15 is a schematic perspective view of an optical switch of the present invention with a light irradiating unit as a deflection controller.

When the photonic crystal contains a photorefractive material, a light irradiation unit (not shown) for irradiating light energy to the photonic crystal 1 can be used as the deflection controller 40, as shown in FIG. 15. In this case, the photonic band structure of the photonic crystal 1 is changed in response to an amount of the light irradiated to the photonic crystal. Therefore, the deflection angle of the incident light beam can be controlled by adjusting the light amount irradiated to the photonic crystal. In brief, when the light energy is applied to the photonic crystal with the 2-dimensional periodic structure, the refraction index of the photonic crystal is changed according to the optical Kerr effect. In this case, since nonlinear optical effect is enhanced due to group-velocity anomaly peculiar to the photonic crystal, it is possible to effectively change the refraction index by a small irradiation amount of light energy. Therefore, it is possible to provide a high-speed optical switch of low-consumption type.

The light energy can be irradiated to the photonic crystal 1 from above or side. In FIG. 15, the light energy (C) is irradiated to the photonic crystal 1 through a waveguide 43 disposed adjacent to the photonic crystal 1. The numeral 60 designates a waveguide for the incident light beam, through which the light beam is incident on the photonic crystal 1 at the incident angle determined by the present method. The numeral 70 designates waveguides for the transmitted light beams provided from the photonic crystal. According to the optical switch of this embodiment, it is possible to achieve a switching speed on the order of nano- or pico- second. In addition, it is available to an optical packet switching network. In case of using this optical device as the variable optical attenuator, a single waveguide 70 may be used to output the transmitted light beam.

Figure 16:
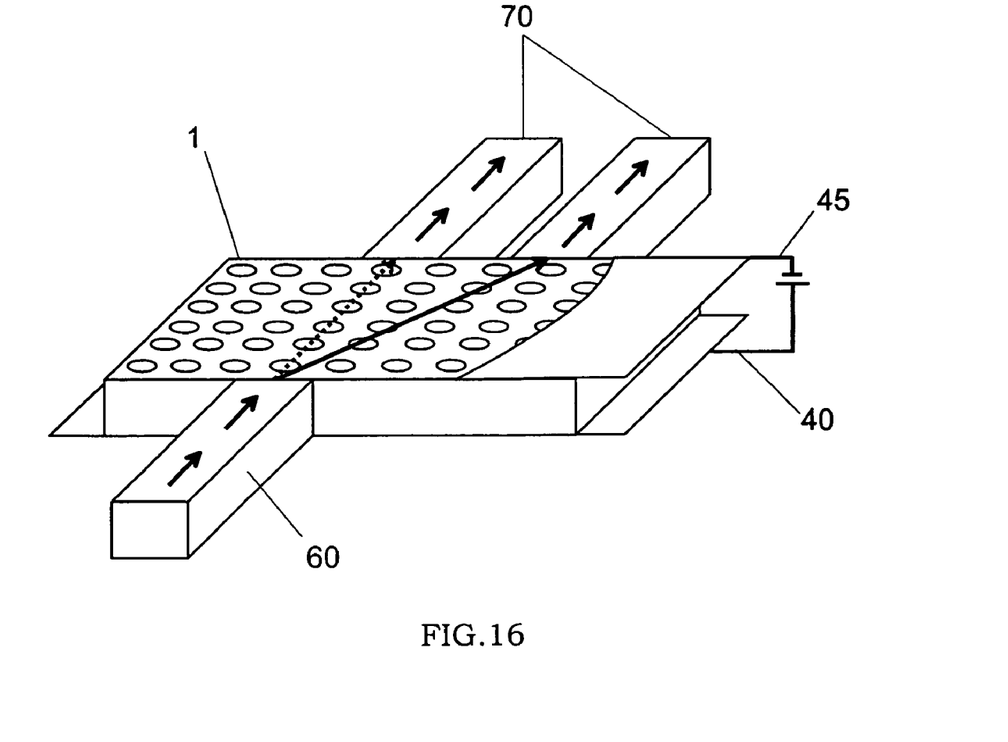
FIG. 16 is a schematic perspective view of an optical switch of the present invention with a carrier injecting unit as the deflection controller.

On the other hand, when the photonic crystal 1 contains a semiconductor material such as Si and GaAs, a carrier injecting unit for supplying carriers such as electrons into the photonic crystal to change a refractive index of the photonic crystal can be used as the deflection controller 40, as shown in FIG. 16. This carrier injecting unit comprises an electric circuit 45 for supplying electrons into the photonic crystal 1. In this case, the photonic band structure of the photonic crystal is changed- in response to the injection amounts of the carriers into the photonic crystal. Therefore, the deflection angle of the light beam incident on the photonic crystal can be controlled by adjusting the amount of electric current flowing through the electric circuit 60, i.e., the supply amounts of electrons into the photonic crystal 1. In this case, since popular elements for integrated circuits such as Si or Ge can be used as the materials for the photonic crystal, there are advantages that existing semiconductor manufacturing lines can be used to produce the optical device of the present invention, and the integration becomes easier.

Thus, when using the electric-filed applying unit, light irradiating unit or the carrier injecting unit as the deflection controller 40 of the optical switch, there is an advantage of providing the compact optical switch with high speed response and reliability, as compared with the case of mechanically loading an external force to the photonic crystal to change the refraction index thereof.

Figure 17A:
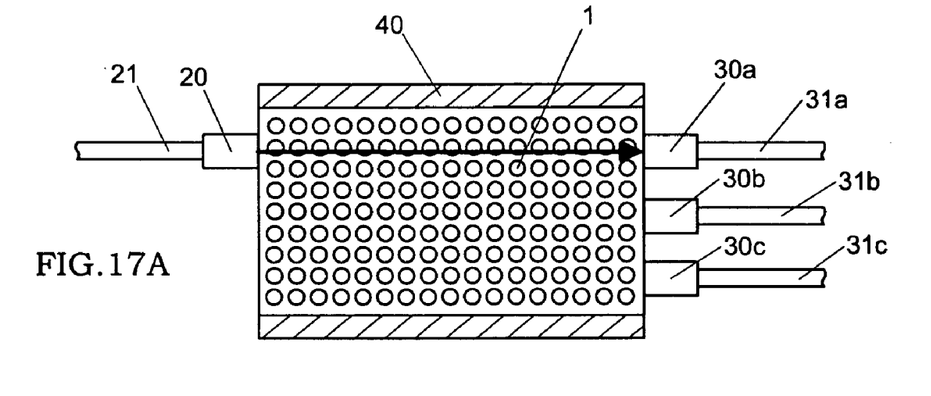
FIGS. 17A to 17C are schematic diagrams illustrating switching operations of the optical switch according to the first embodiment of the present invention.
Figure 17B:
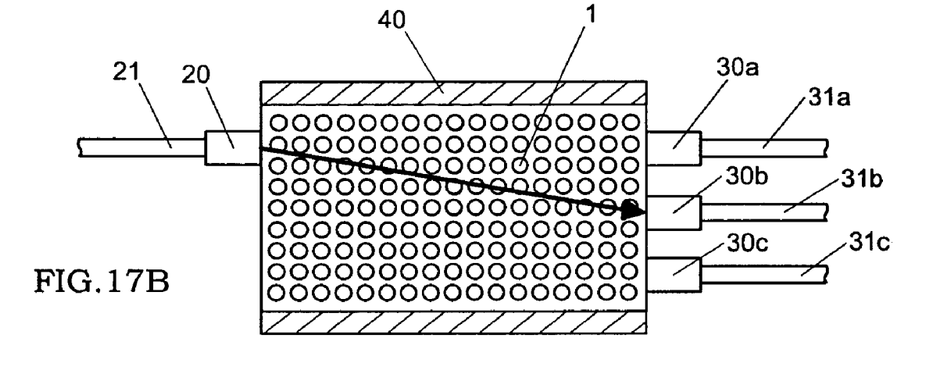
Figure 17C:
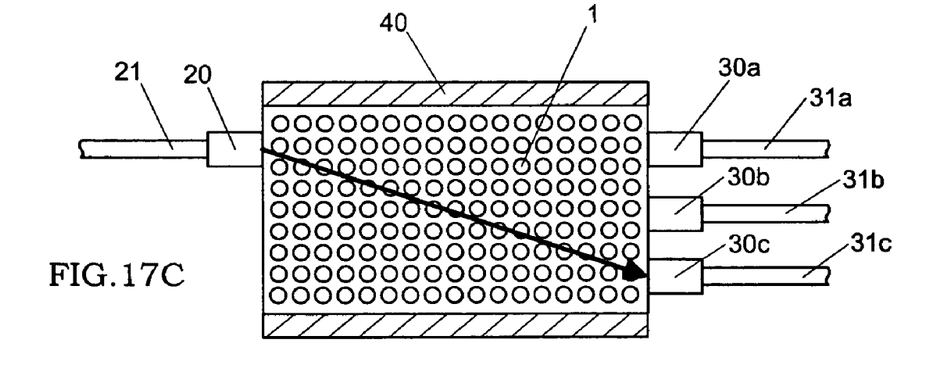

Next, switching operations of the optical switch of the present invention are briefly explained referring to FIGS. 17A to 17C. This optical switch comprises a single light input terminal 20 such as a rod lens for allowing a light beam provided from an optical fiber 21 to be incident on one side of the photonic crystal 1, three light output terminals 30a, 30b, 30c such as rod lenses, through any one of which a transmitted light beam is provided from the opposite side of the photonic crystal to a corresponding optical fiber 31a, 31b, 31c, and the deflection controller 40 disposed at top and bottom sides of the photonic crystals 1. Therefore, this optical switch can selectively provide three different light outputs from one incident light beam by the deflection controller 40.

For example, in the case of FIG. 17A, since external energy is not applied to the photonic crystal though the deflection controller, the incident light beam is not deflected by the photonic crystal, so that the transmitted light beam is output to the corresponding optical fiber 31a through the output terminal 30a, as shown by the arrow. At this time, the transmitted light beam is not output to the remaining output terminals 30b, 30c.

In the case of FIG. 17B, since the refraction index of the photonic crystal is changed by applying the external energy to the photonic crystal, the transmitted light beam is output to the corresponding optical fiber 31b through the output terminal 30b, as shown by the arrow. For example, a deflection angle less than 43 degrees is obtained by 0.7% change in the refraction index. At this time, the transmitted light beam is not output to the remaining output terminals 30a, 30c.

In the case of FIG. 17C, since the refraction index of the photonic crystal is changed by applying a larger external energy to the photonic crystal, the transmitted light beam is output from the output terminal 30c to the corresponding optical fiber 31c, as shown by the arrow. For example, the deflection angle of 43 degrees is obtained by 1% change in the refraction index. At this time, the transmitted light beam is not output to the remaining output terminals 30a, 30b. As a modification of this optical switch, the number of light output terminals may be two, or more than three.

Figure 18:
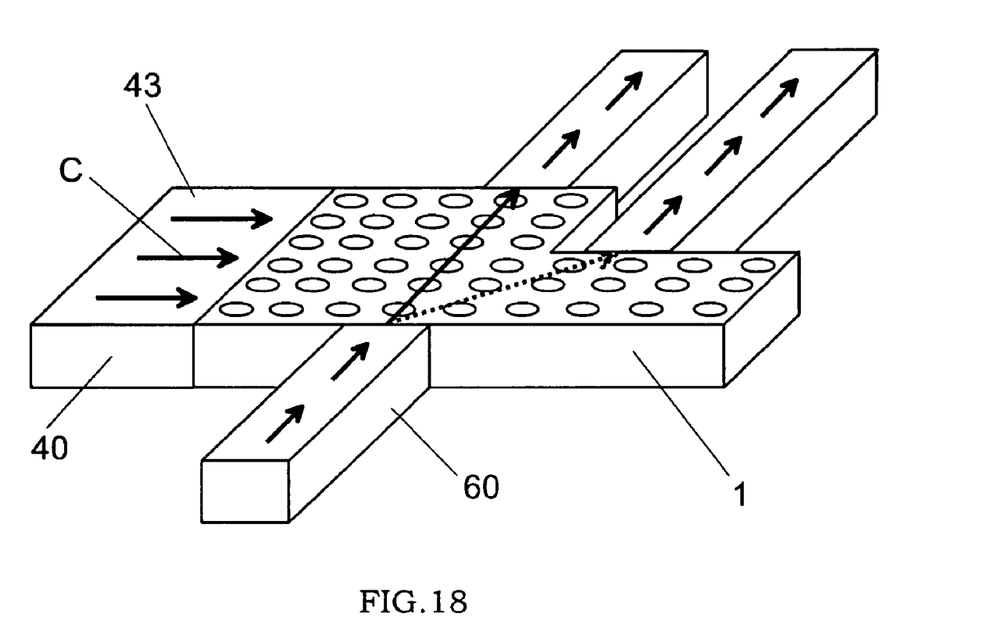
FIG. 18 is a schematic perspective view showing a modification of the optical switch of FIG. 15.

As a modification of the optical switch of the present invention, as shown in FIG. 18, a corner portion of the rectangular photonic crystal 1 may be removed such that two optical paths shown by the solid arrow and the dotted arrows have a constant length. In this case, it is possible to prevent phase lag.

Second Embodiment

In the first embodiment, the optical switch was explained, which is characterized in that an external energy is aggressively applied to the photonic crystal 1 to change a refraction index thereof, so that the light beam can be deflected at the large angle by the photonic crystal. In the second embodiment, an optical sensor is explained, which has the capability of detecting an environmental change around the photonic crystal with a high sensitivity. That is, when the photonic crystal is subjected to the environment change such as a thermal change or a pressure change, the deflection angle of the light beam incident on the photonic crystal changes. Therefore, it is possible to detect the environment change according to the change of deflection angle.

Figure 19:
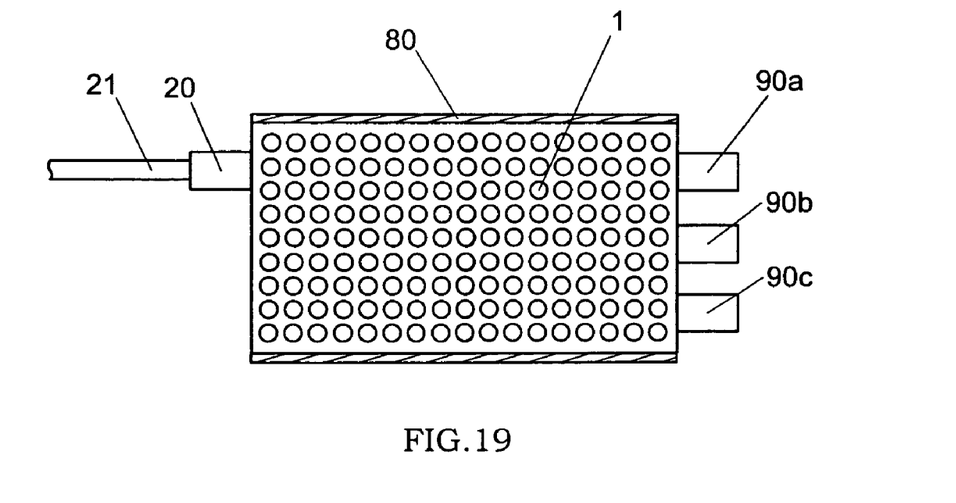
FIG. 19 is a schematic view of an optical sensor according to a second embodiment of the present invention.

As shown in FIG. 19, this optical sensor comprises the photonic crystal 1 described in the first embodiment, light input unit 20 (e.g., light input terminal or waveguide) disposed on a light input surface of the photonic crystal, through which a light beam provided from an optical fiber 21 is incident on the photonic crystal at an incident angle determined according the present invention, and detectors (90a, 90b, 90c) disposed on a light output surface other than the light input surface of the photonic crystal to detect a transmitted light beam provided from the photonic crystal. According to this optical sensor, a change of the deflection angle of the light beam incident on the photonic crystal caused when energy is applied to the photonic crystal by the environmental change can be detected by any one of the detectors. Therefore, it is possible to provide the optical sensor for detecting the environmental change with high sensitivity. In FIG. 19, the numeral 80 designates a supporting member for the photonic crystal 1.

When the wavelength of the light beam incident on the photonic crystal is constant, a change in the pitch "a" of the photonic crystal is caused by the influence of heat or stress applied to the photonic crystal, so that the deflection angle changes. By monitoring the change of the deflection angle, it is possible to detect the environmental change around the photonic crystal with a high sensitivity. For example, in the case of the optical sensor using the photonic crystal with the two-dimensional periodic structure shown in FIG. 19, a slight change of lattice constant (pitch) of the photonic crystal caused by thermal expansion can be detected as a change of optical strength. Therefore, this optical sensor functions as a heat sensor. Alternatively, in the case of detecting a change of lattice constant of the photonic crystal caused by a stress or a pressure applied to the photonic crystal, this optical sensor functions as a pressure sensor. Other configurations are substantially the same as the first embodiment.

What is claimed is:

1. An optical device comprising:
    a photonic crystal designed to have a shape of a dispersion surface with a strong direction dependence at a frequency;
    light input means configured to allow a light beam having a wavelength determined by said frequency to be incident on said photonic crystal at an incident angle determined from a region with a large change of direction dependence in the shape of the dispersion surface according to the law of conservation of momentum; and
    a deflection controller configured to apply an energy to said photonic crystal in order to switch between a first optical path for allowing the light beam incident on said photonic crystal to pass through said photonic crystal, thereby obtaining a first transmitted light beam, and a second optical path, which is angularly different from said first optical path, for allowing the light beam incident on said photonic crystal to pass through said photonic crystal, thereby obtaining a second transmitted light beam.

2. The optical device as set forth in claim 1, further comprising at least one detector disposed adjacent to said photonic crystal to receive the light beam provided from said photonic crystal, and wherein when an energy change in said photonic crystal is caused by an environmental change around said photonic crystal, said detector detects a change of deflection angle of the light beam by said photonic crystal, or a change of optical strength derived from the change of deflection angle and thereby recognize said environmental change.

3. The optical device as set forth in claim 1, wherein said photonic crystal has a two-dimensional periodic structure formed by arranging a plurality of air holes having a refraction index of 1 in a lead lanthanum zirconium titanate (PLZT) having a refraction index of 2.5 in a triangular pattern such that a normalized frequency "$\lambda/a$" determined by dividing a wavelength "$\lambda$" of the light beam by a pitch "a" between adjacent air holes is 0.537, and wherein said light beam is allowed to be incident on said photonic crystal at the incident angle of 22 degrees with respect to a "Γ–K" direction perpendicular to a "Γ–M" direction of an incident surface of said photonic crystal.

4. The optical device asset forth in claim 4, wherein the pitch "a" is 0.8 μm, and a diameter of said air holes is 0.56 μm.

5. The optical device as set forth in claim 1, wherein a light output surface of said photonic crystal is of an arcuate surface.

6. A method of determining an optimum angle of a light beam incident on said photonic crystal of the optical device as set forth in claim 1, said method comprising the steps of:
    preparing said photonic crystal made of two different materials having first and second refraction indexes;
    making a first frequency dispersion curve at the first refraction index;
    making a second frequency dispersion curve at the second refraction index;
    selecting a frequency at which the magnitude of wave-number vector changes from between the first and second frequency dispersion curves;
    constructing a constant frequency dispersion surface at said frequency; and
    determining the optimum angle from a region with a maximum change of direction dependence in the constant frequency dispersion surface according to the law of conservation of momentum.

7. The method as set forth in claim 6, wherein said photonic crystal has a two-dimensional periodic structure formed by arranging a plurality of air holes having a refraction index of 1 in a lead lanthanum zirconium titanate (PLZT) having a refraction index of 2.5 in a triangular pattern, and said frequency is selected such that a normalized frequency "$\lambda/a$" determined by dividing a wavelength "$\lambda$" of the light beam by a pitch "a" between adjacent air holes is 0.537.

* * * * *